(12) United States Patent
Nishimoto et al.

(10) Patent No.: US 6,560,676 B1
(45) Date of Patent: May 6, 2003

(54) CACHE MEMORY SYSTEM HAVING A REPLACE WAY LIMITATION CIRCUIT AND A PROCESSOR

(75) Inventors: Akira Nishimoto, Kawasaki (JP); Eiki Kamada, Isehara (JP); Akira Hirono, Hadano (JP)

(73) Assignee: Hitachi, Ltd., Tokyo (JP)

( * ) Notice: Subject to any disclaimer, the term of this patent is extended or adjusted under 35 U.S.C. 154(b) by 34 days.

(21) Appl. No.: 09/699,227

(22) Filed: Oct. 26, 2000

(30) Foreign Application Priority Data

Jan. 13, 2000 (JP) ........................................ 2000-009972

(51) Int. Cl.[7] .............................................. G06F 12/08
(52) U.S. Cl. ........................ 711/128; 711/133; 711/137
(58) Field of Search ................................ 711/100, 128, 711/133, 136, 137, 154

(56) References Cited

U.S. PATENT DOCUMENTS 4,464,717 A * 8/1984 Keeley et al. .............. 711/122
5,274,790 A * 12/1993 Suzuki ........................ 711/133
5,787,490 A * 7/1998 Ozawa ........................ 711/173
6,138,213 A * 10/2000 McMinn ..................... 711/137

FOREIGN PATENT DOCUMENTS

JP        07281957        10/1995

* cited by examiner

Primary Examiner—Tuan V. Thai
(74) Attorney, Agent, or Firm—Townsend and Townsend and Crew LLP

(57) ABSTRACT

A cache memory system employing a set associative system with a plurality of ways which can store data having a same set address is disclosed. The cache memory system includes a replace circuit for controlling replacement of data stored in a cache memory according to a predetermined replace algorithm, and a limiting circuit for limiting ways to which blocks to be replaced by the replace circuit belong. The limiting circuit receives a mode signal specifying whether replace ways should be limited. The limiting circuit limits ways to be replaced when the mode signal indicates that the limitation should be performed and an instruction to be executed is a prefetch instruction.

14 Claims, 9 Drawing Sheets

FIG.5

| way＼NUMBER | (0) | (1) | (2) | (3) | (4) | (5) |
|---|---|---|---|---|---|---|
| way0 | 0 |   |   | 0 | 0 |   |
| way1 | 1 | 0 |   |   |   | 0 |
| way2 |   |   | 0 | 1 |   | 1 |
| way3 |   | 1 | 1 |   | 1 |   |

| way＼NUMBER | (0) | (1) | (2) | (3) | (4) | (5) |
|---|---|---|---|---|---|---|
| way0 | 1 |   |   | 1 | 1 |   |
| way1 | 0 | 1 |   |   |   | 1 |
| way2 |   |   | 1 | 0 |   | 0 |
| way3 |   | 0 | 0 |   | 0 |   |

302

| LRU INSTRUCTION (SIGNAL 132) | NUMBER OF ON-THE-FLY PREFETCH INSTRUCTIONS TO SAME SET | | | | | | | |
|---|---|---|---|---|---|---|---|---|
| | 0 | 1 | 2 | 3 | 4 | 5 | 6 | 7 |
| way0 | way0 | way1 | way2 | way3 | way0 | way1 | way2 | way3 | ... |
| way1 | way1 | way0 | way3 | way2 | way1 | way0 | way3 | way2 | ... |

FIG.10

```
#define N 100
#define M 16000
float S[N] [M] ;
float T[N] [M] ;

foo ()
{
    int a,b,c,d;
    int i, j;                                802
                                ┌─────────────┴──────────────┐
                                │ for (i=0; i<N; i++) {  803 │
                                │    .            ┌──────┘   │
                                │ USE OF LOCAL VARIABLE;  801│
                                │           ┌──────────┘     │
                                │  ┌────────┴──────────────┐ │
                                │  │ for (j=0; j<M; j++) { │ │
                                │  │     T[i][j]=S[i][j];  │ │
                                │  │ }                     │ │
                                │  └───────────────────────┘ │
                                │ }                          │
                                └────────────────────────────┘
}
```

FIG.11

```
#define N 100
#define M 16000
float S[N] [M] ;
float T[N] [M] ;

foo ()
{
    int a,b,c,d;
    int i, j;                                802
                                ┌─────────────┴──────────────┐
                                │ for (i=0; i <N; i++) { 803 │
                                │    .            ┌──────┘   │
                                │ USE OF LOCAL VARIABLE;  901│
                                │           ┌──────────┘     │
                                │  ┌────────┴──────────────┐ │
                                │  │ for (i=0; i <M; i++) {│ │
                                │  │     LD r1 S[i][j];    │ │
                                │  │     ST r1 T[i][j]     │ │
                                │  │ }                     │ │
                                │  └───────────────────────┘ │
                                │ }                          │
                                └────────────────────────────┘
}
```

FIG.12

```
#define N 100
#define M 16000
float S[N] [M] ;
float T[N] [M] ;
foo ()
{
    int a,b,c,d;
    int i, j;
                                                                    1000
    ┌─────────────────────────────────────────────────────┐
    │ for (i=0; i<N; i++) {                               │
    │     prefetch S[ i ] [0 ]          1010              │
    │     USE OF LOCAL VARIABLE;           1001           │
    │     ┌───────────────────────────────────────┐       │
    │     │ /*USE OF WAY 0*/                      │       │
    │     │ ┌─────────────────────────────────┐   │       │
    │     │ │ for (i=0; i<M/4; j+16) {        │   │       │
    │     │ │     prefetch S[ i ] [j+16]      │   │ 1002  │
    │     │ │     for (k=0; k<16; k++) {      │   │       │
    │     │ │         LD r1 S[ i ] [ j+k ] ;  │   │       │
    │     │ │     }   ST r1 T[ i ] [ j+k ]    │   │       │
    │     │ │ }                               │   │       │
    │     │ └─────────────────────────────────┘   │       │
    │     │ /*USE OF WAY 1*/                      │       │
    │     │ ┌─────────────────────────────────┐   │       │
    │     │ │ for (i=M/4; j<M/2; j+j16) {     │   │       │
    │     │ │     prefetch S[ i ] [j+16]      │   │ 1003  │
    │     │ │     for (k=0; k<16; k++) {      │   │       │
    │     │ │         LD r1 S[ i ] [ j+k ] ;  │   │       │
    │     │ │     }   ST r1 T[ i ] [ j+k ]    │   │       │
    │     │ │ }                               │   │       │
    │     │ └─────────────────────────────────┘   │       │
    │     │ /*USE OF WAY 0*/                      │       │
    │     │ ┌─────────────────────────────────┐   │       │
    │     │ │ for (j=M/2; j<3*M; j=j+16) {    │   │       │
    │     │ │     prefetch S[ i ] [j+16]      │   │ 1004  │
    │     │ │     for (k=0; k<16; k++) {      │   │       │
    │     │ │         LD r1 S[ i ] [ j+k ] ;  │   │       │
    │     │ │     }   ST r1 T[ i ] [ j+k ]    │   │       │
    │     │ │ }                               │   │       │
    │     │ └─────────────────────────────────┘   │       │
    │     │ /*USE OF WAY 1*/                      │       │
    │     │ ┌─────────────────────────────────┐   │       │
    │     │ │ for (j=3*M/4; j<M; j=j+16) {    │   │       │
    │     │ │     prefetch S[ i ] [j+16]      │   │ 1005  │
    │     │ │     for (k=0; k<16; k++) {      │   │       │
    │     │ │         LD r1 S[ i ] [ j+k ] ;  │   │       │
    │     │ │     }   ST r1 T[ i ] [ j+k ]    │   │       │
    │     │ │ }                               │   │       │
    │     │ └─────────────────────────────────┘   │       │
    │     └───────────────────────────────────────┘       │
    │ }                                                   │
    └─────────────────────────────────────────────────────┘
}
```

CACHE MEMORY SYSTEM HAVING A REPLACE WAY LIMITATION CIRCUIT AND A PROCESSOR

BACKGROUND OF THE INVENTION

The present invention relates to a cache memory system in a computer system, and more particularly to a cache memory system capable of restricting replacement of data highly likely to be used afterward from a cache.

In a computer system it is known that main memory references by a computer program have locality. By utilizing this characteristic, frequently accessed main memory data can be copied to a high-speed small-capacity memory, called a cache memory system (hereinafter referred to as a cache). Then an access to main memory is replaced by an access to the cache, thereby enhancing memory access speed. A cache is described in detail, for example, in "Computer Architecture: A Quantitative Approach to its Design, Realization, and Evaluation," pages 403–28, translated by Shinji Tomita, Kazuaki Murakami, and Haruo Niimi, published by Nikkei Business Publications, Inc.

Data exchanged between a cache and a main memory is managed in appropriate data size units, individually referred to as blocks. The size of a block is called a block size. A cache stores a plurality of blocks. For example, when a cache has a capacity (a cache size) of 128K bytes, and a block size is 128 bytes, 1024 blocks are stored in the cache.

Data stored in a cache is held in a memory called a data array. To identify which block in a main memory has been stored in a cache, the address of the stored block is held in a memory called an address array. To determine whether data to be referenced by a processor is located in a cache, addresses held in the address array are compared with an address referenced by the instruction.

Cache configurations are classified into three systems depending on where blocks are placed in the cache: the direct map system in which the address of each block in a main memory uniquely decides its position in a cache; the full associative system in which each block in a main memory is placed in any arbitrary place in a cache; and the set associative system in which blocks in each area of a main memory are placed in each predetermined area in a cache. In the full associative system, to determine whether data is located in a cache, it is necessary to compare an address referenced by an instruction against the addresses of all blocks stored in the cache. This is not practical considering the required hardware. For this reason, the direct map system or the set associative system are generally used to map each block of a main memory.

A cache employing a set associative system has its memory area divided into blocks arranged in N rows and M columns. Each block stores data and its own address. Each row in the cache is called a set, while each column is called a way. In the set associative system, a block fetched from a main memory is stored in one of the ways in a set uniquely determined by the address of the block. When there is an invalid (empty) way in the set, the block is stored in it. If all the ways are valid, the contents of one of the ways in the set are replaced and returned to the main memory, and the new block fetched from the main memory is stored in the way.

For replacement of a block, the LRU (Least Recently Used) algorithm is generally used to determine a target way for the replacement. In the LRU algorithm, a way which stores data referenced least recently in the respective set is used as a target for the replacement. When data to be referenced exists in a cache, the memory access is performed at high speed because it is not necessary to access the main memory. When data to be referenced is not in a cache, however, execution of an instruction using the data is delayed until the data is fetched from the main memory. To reduce delay time due to a cache miss such as this, a prefetch method is conventionally used. In a prefetch operation, a prefetch instruction is executed before a load instruction is executed so that data to be used by the load instruction is fetched beforehand. This causes a cache hit at the time of execution of the load instruction.

SUMMARY OF THE INVENTION

Generally, analysis of memory access patterns of computer programs often indicates the following characteristics:

(1) An access to data in a certain address recurs within a relatively short time.

(2) Data accessed during a period of time is distributed over addresses relatively close to one another.

The former characteristic is called "temporal locality", while the latter is called "spatial locality." Generally, data stored in a cache by a prefetch instruction exhibits spatial locality, but not temporal locality. Scalar data such as stack data does not show spatial locality, but shows temporal locality.

In a cache employing a set associative system in which the LRU method is used as a replacement algorithm, when a large array having spatial locality, but not temporal locality is accessed, data having temporal locality such as data in a stack is replaced from the cache, overwriting all data within the cache with the above array. A technique for solving the problem that a block having temporal locality is replaced from the cache by a block having spatial locality, but not temporal locality, as described above, is disclosed, for example, in Japanese Laid-Open Patent Publication No. 7-281957 (1995). According to this technique, when data likely to be used again is first referenced, the LRU function is locked, and the lock is released when the data is used lastly.

In the above LRU lock method, however, the LRU function may not be activated after a process is switched to another process, or cache usage may be reduced. Consider, for example, that the LRU function is locked when a stack is first referenced in a process A,. and then the process A is switched to a process B before the lock is released. In this case, even though the process A has been switched to the process B, the LRU function remains locked. Therefore, the block which has been designated as a replacement target when the LRU function was locked is still a replacement target in the locked column despite switching of the processes. This may cause the locked column of the process B to operate as if the cache were of a direct map type, resulting in a great reduction in cache usage. Thus, the above conventional technique using the LRU function may degrade performance. Use of the LRU lock method disclosed in Japanese Laid-Open Patent Publication No. 7-281957 (1995) may lead to a reduction in cache usage in the multiprocess environment.

The present invention provides a cache memory system capable of limiting occurrence of replacement of data having temporal locality due to reference to data having spatial locality, but not temporal locality. In addition it is capable of properly performing the LRU function in a multiprocess environment without employing a special process.

To achieve the above, the present invention provides a cache memory system employing a set associative system with a plurality of ways which can store data having a same set address. Preferably, the cache memory system includes, when a cache miss occurs, inputting a mode signal which instructs limiting of replace ways to be used for storing a block containing data to be accessed, and a replace way determining circuit for, when replace ways are limited by use of the mode signal, determining a replace way from among a plurality of ways. In a preferred mode, according to the present invention, the replace ways are limited when an instruction to be executed is a prefetch instruction to preread data. Furthermore, a replace way is determined based on the number of prefetch instructions in execution which access a same set.

As another aspect, the present invention provides a processor having a cache memory system employing a set associative system in which the LRU method is used as a replace algorithm for a cache block. The cache memory system has a circuit for limiting ways in which data fetched by use of a prefetch instruction is stored. The cache memory system changes its method for determining a replace way depending on the number of prefetch instructions in execution which access a same set.

Thus, by limiting ways which store prefetch data having low temporal locality, it is possible to make it difficult for data having high temporal locality, such as scalar data, to be replaced from a cache by the prefetch data, even when a large amount of data is fetched in the cache by use of a prefetch instruction.

BRIEF DESCRIPTION OF THE DRAWINGS

FIG. 5 is a diagram of a decoding table used to determine a least recently accessed way from 4 ways using LRU information;

FIG. 6 is a diagram of an encoding table used to change the LRU function;

FIG. 10 is a source program of a program in which a large array having spatial locality, but not temporal locality, is accessed;

FIG. 11 is a program list for a program in which the inner loop of the program shown in FIG. 10 is replaced with pseudo-instructions; and FIG. 12 is a program list for a program in which prefetch instructions are applied to the program shown in FIG. 11.

DESCRIPTION OF THE SPECIFIC EMBODIMENTS

Figure 1:
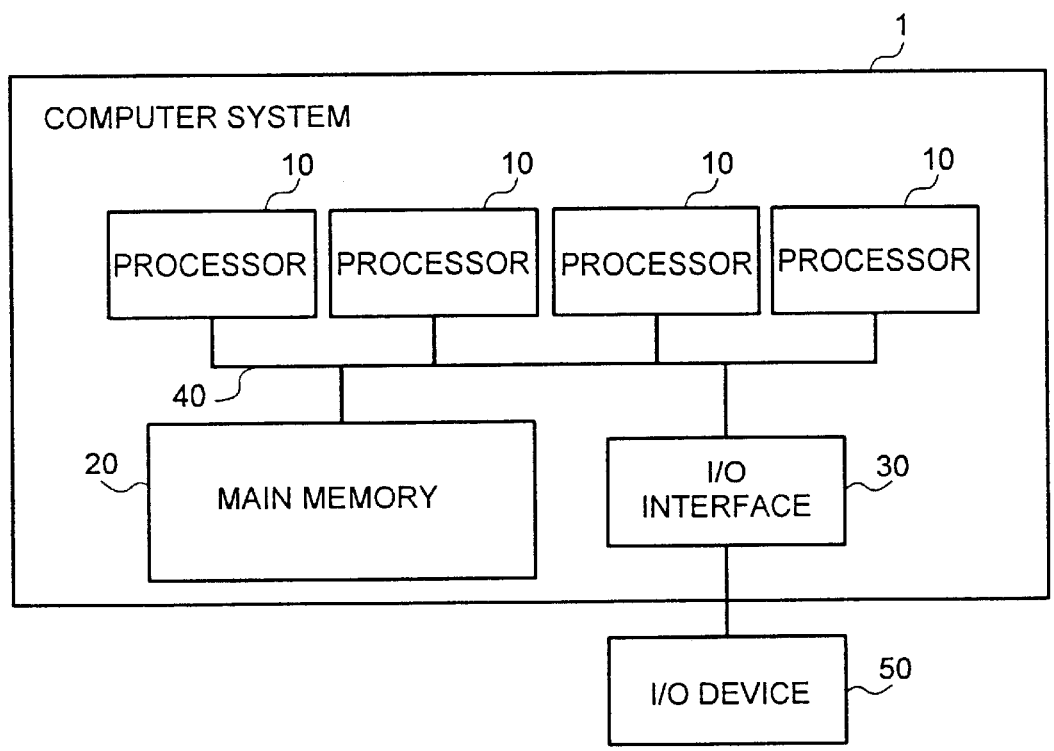
FIG. 1 is a schematic block diagram of a computer system according to a first embodiment of the present invention.

FIG. 1 is a block diagram of the configuration of a computer system according to an embodiment of the present invention. Computer system 1 comprises a plurality of processors 10, a main memory system 20, and an I/O interface 30. Processors 10, main memory system 20, and I/O interface 30 are connected to one another through a bus 40. The I/O interface 30 is connected to an I/O device or an external network. Each processor 10 sequentially reads and executes programs stored in the main memory system 20. Each processor 10 also reads out data stored in the main memory system 20 or writes data in the main memory system 20 according to execution of a program.

Figure 2:
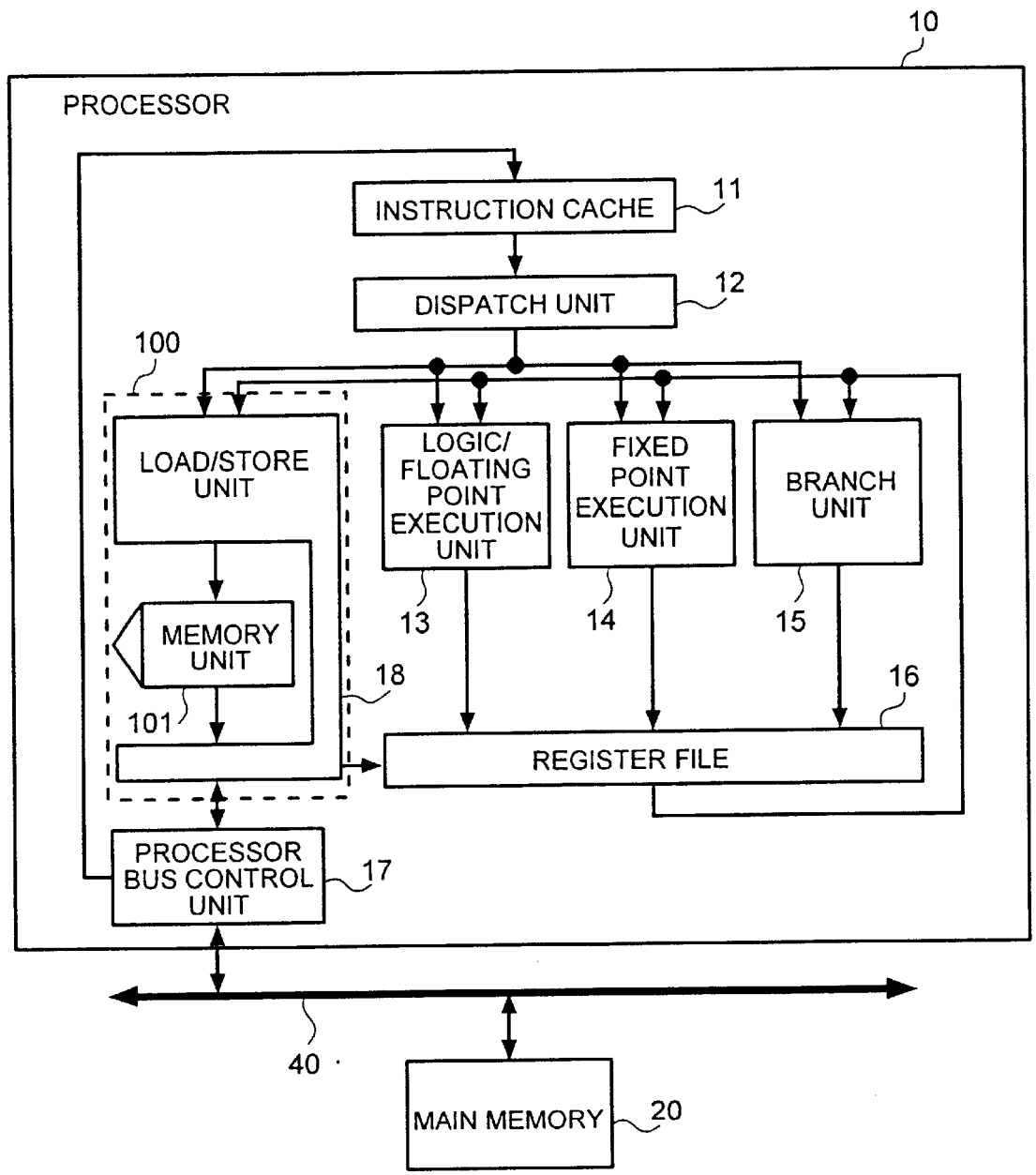
FIG. 2 is a schematic block diagram of a processor.

FIG. 2 is a block diagram of a configuration of a processor 10. Each processor 10 includes an instruction cache 11, a dispatch unit 12, a floating point execution unit 13, a fixed point execution unit 14, a branch unit 15, a register file 16, a processor bus control unit 17, and a cache memory system 100. The instruction cache 11 temporarily stores instructions read from the main memory system 20. The dispatch unit 12 reads an instruction from the instruction cache 11, decodes it, and dispatches it to the unit corresponding to the operation to be performed.

The floating point execution unit 13, the fixed point execution unit 14, and the branch unit 15 execute floating point instructions, fixed point instructions, and branch instructions, respectively. The cache memory system 100 includes a load/store unit, which executes a load/store instruction dispatched by the dispatch unit, and a memory unit 101, which stores a copy of part of data stored in the main memory system 20.

The register file 16 includes various registers for storing data used for each unit to execute an instruction, or storing data output from each unit as a result of execution of an instruction. The register file 16 also includes an SPR (Special Purpose Register) for generating a mode signal as described below. The processor bus control unit 17 controls data input to or output from the main memory unit 20, etc. connected to the bus 40.

Each processor 10 is generally implemented as a single LSI chip. In this embodiment, even though each processor 10 is configured such that it has the cache memory system 100 therein, if desired, at least a part of the cache memory system 100, including memory unit 101, may be provided outside the processor 10.

Figure 3:
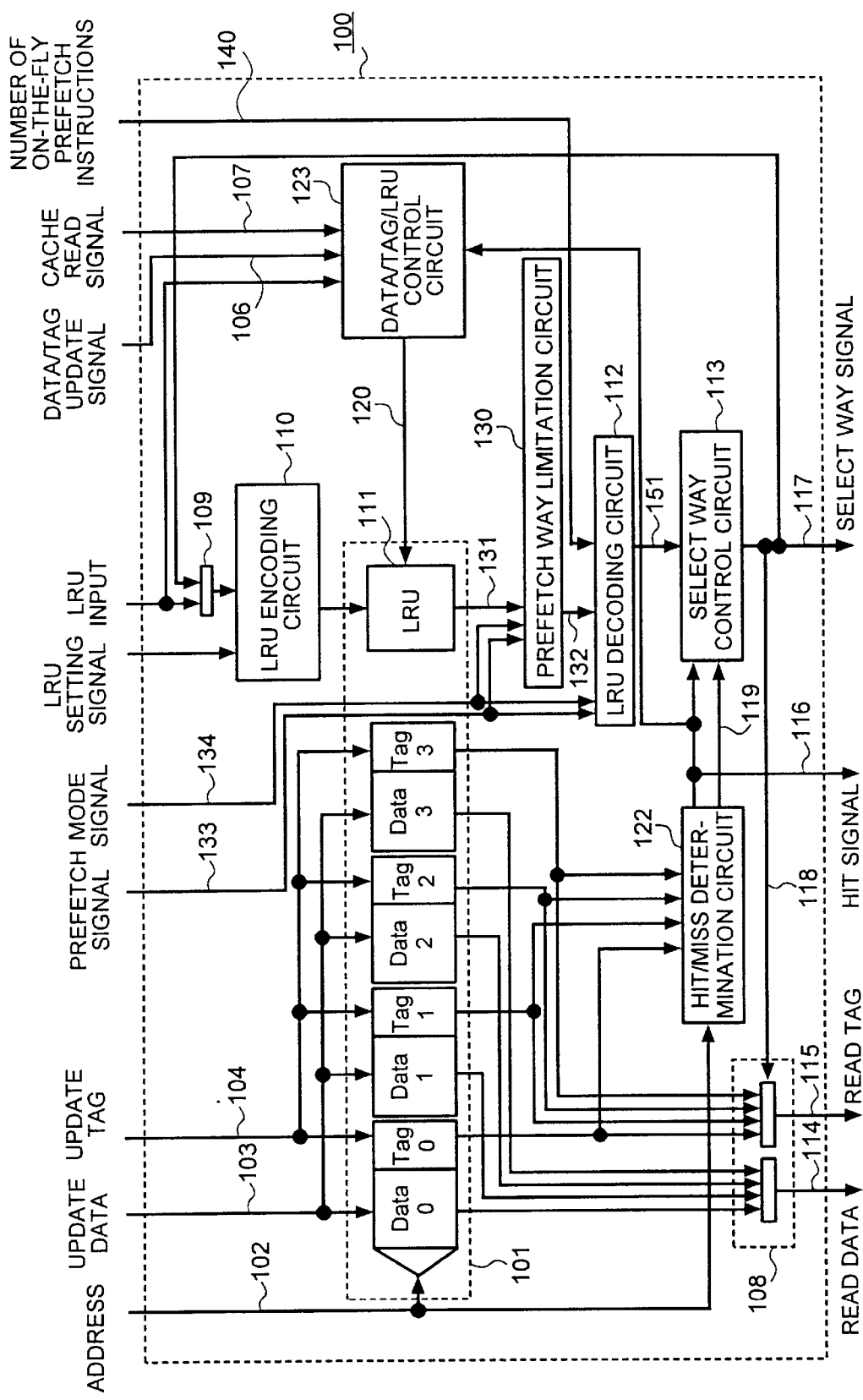
FIG. 3 is a schematic block diagram of a cache memory system.

FIG. 3 is a schematic block diagram of cache memory system 100. According to this embodiment, the cache memory system has a cache size of 128K bytes and a block size of 128 bytes, and employs a 4-way set associative system. The cache memory system uses LRU as a block replacement algorithm, and is controlled by a store through method. It should be noted that in the figure, portions of the load/store unit 18 not related to the present invention are not shown.

The cache memory system 100 includes a memory unit 101, a selector 108, a hit/miss determination circuit 122, an LRU encoding circuit 110, a prefetch way control circuit 130, an LRU decoding circuit 112, a select row control circuit 113, and a data/tag/LRU control circuit 123. Memory unit 101 includes a data array for storing data as cached data, an address array for storing the addresses (tags) of the data, and an LRU array 111. The data array and the address array are each divided into 4 columns to form 4 pairs of data and address columns (ways), and each way has 256 blocks (sets) storing data and tags. The LRU array 111 stores reference history information (LRU information) on data stored in the memory unit 101 for each set.

Selector 108 selects data to be output from data read out from the memory unit 101. Based on an address output from the CPU and tag information stored in the memory unit 101, the hit/miss determination circuit 122 performs hit/miss determination to determine whether target data exists in a cache. The LRU encoding unit 110 generates an LRU information value to be written in the LRU array 111. The prefetch way limitation circuit 130 limits ways to be used when an LRU information value read from the LRU array indicates that the target instruction is a prefetch instruction. The LRU decoding circuit 112 determines a way containing data to be replaced from the cache memory system 100 based on an LRU information value output from the prefetch way limitation circuit 130. The select row control circuit 113 generates a select signal 118 used to select a block from 4 blocks in a column read from the data array and the address array. The data/tag/LRU control circuit 123 controls writing and reading of data to and from the data array, the address array, and the LRU array.

Next is described the operation of the cache memory system 100, especially operation of the LRU decoding circuit 112 and the LRU encoding circuit 110 when executing an ordinary load instruction. The following description assumes that an address is composed of 40 bits, and its upper 25 bits form the index of a main memory block to be stored in a set, the next 8 bits express a set number indicating a set position in the memory unit 101, and the lower 7 bits form an offset value in the block. These bit groups are called the block address portion, the set address portion, and the offset address portion, respectively. When execution of a prefetch instruction is in a state between the process of determining a cache miss and the process of fetching data into the cache memory system 100, this prefetch instruction is said to be in the on-the-fly state.

When an ordinary load instruction is issued by the CPU, the cache memory system 100 receives an address 102 indicating the storage position of data to be referenced by the instruction in the main memory, a data/tag update signal 106 indicating whether nor not to update data and a tag, and a cache read signal 107 instructing reading of data from the cache memory system 100. Upon receiving these signals, the cache memory system 100 first accesses its data array and address array based on the set address portion of the address 102, and reads data and tags stored in ways 0 through 3 in the set corresponding to the set number.

Next, the hit/miss determination circuit 122 compares the four read tags with the block address portion of the address referenced by the load instruction. If the comparison by the hit/miss determination circuit 122 indicates that one of the read tags coincides with the block address portion, this means that the block to be referenced by the load instruction exists in the cache (cache hit). At that time, the hit/miss determination circuit 122 outputs a "1" as a hit signal 116. When none of the read tags coincides with the block address portion, the block to be referenced by the load instruction does not exist in the cache (cache miss), and a "0" is output as the hit signal 116.

When a cache hit occurs, the hit/miss determination circuit 122 outputs the way number of the hit way as a hit way signal 119, together with the hit signal 116.

The select way control circuit 113 determines the way to be read according to a determination result by the hit/miss determination circuit 122. When the determination result is a cache hit (the hit signal 116 is "1"), the select way control circuit 113 outputs the way number indicated by the hit way signal 119, as a select way signal 117. This select way signal 117 is also used as a select signal 118 to the selector 108. Using the select signal 118, the selector 108 selects a piece of data and a tag from 4 pieces of data and 4 tags read at the same time, and outputs read data 114 and a read tag 115 as a result of execution of the load instruction.

When the result from the hit/miss determination circuit 122 is a cache miss, the select way control circuit 113 outputs an LRU way signal 151 (a way number indicating a replacement target way) output from the LRU decoding circuit 112, as the select way signal 117. After that, data is fetched from the main memory so that the update data 103 and the update tag 104 are supplied to the cache memory system and a block of data is written in the memory unit 101. At that time, the data is written in a way indicated by a replacement target way number, which has been output as the select way signal 117.

When a cache miss occurs, the prefetch way limitation circuit 130 and the LRU decoding circuit 112 determine the replacement target way. An LRU information value output from the LRU array 111 for the respective set is input to the prefetch way limitation circuit 130. At that time, when a prefetch instruction is the current instruction and a mode signal 134 is "1", the LRU information value is changed so as to limit ways which can be used, as described later. With an instruction other than a prefetch instruction, the prefetch way limitation circuit 130. does not change the LRU information value output from the LRU array 111, and outputs it as an LRU signal 132. The LRU information value output from the prefetch way limitation circuit 130 is input to the LRU decoding circuit 112 which outputs the number of a way to be replaced, as an LRU way signal 151.

Figure 4:
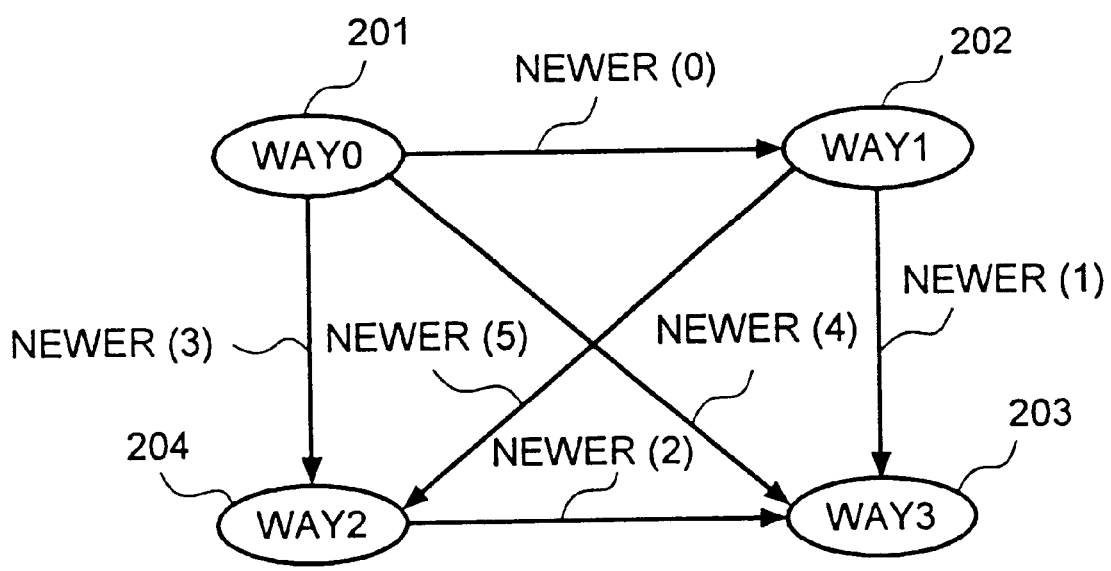
FIG. 4 is a conceptual diagram of a method for realizing the LRU function for a 4-way set associative system.

FIG. 4 shows a method for realizing the LRU function for a 4-way set associative system. This method uses 6 bits to indicate LRU information for each set. Three bits of the six bits are used to determine the most recently accessed way or to update LRU information with the most recently accessed way. In FIG. 4, nodes 201, 202, 203, and 204 each denote one of the ways of a 4-way set associative system. Edges (arrows) NEWERs (0) through (5) between nodes each indicate that the end node of the edge has been referenced more recently than the start node. A node which is a start node with respect to all of its edges is the least recently accessed node (a node corresponding to the replacement target way), while a node which is an end node with respect to all of its edges is the most recently accessed node. It is assumed that the state shown in FIG. 4 is the initial state, and the directions of the NEWERs (0) through (5) are represented by 6 bits, that is, the initial state is expressed as NEWER (0–5)=(0,0,0,0,0,0). When the direction of an edge is reversed from its initial direction, the corresponding bit is set to "1". When the directions of all edges are reversed from the initial directions, the nodes are expressed as NEWER (0–5)=(1,1,1,1,1,1). This 6-bit information is used as LRU information, and held in the LRU array 111.

When a cache miss occurs, 6-bit LRU information is output from the LRU array 111, and input to the prefetch way limitation circuit 130. With an ordinary load instruction, an LRU information value fed to the prefetch way limitation circuit 130 is input to the LRU decoding circuit 112 as it is, as described above.

FIG. 5 illustrates a decoding table used to determine the least recently accessed way from 4 ways using LRU information in the LRU decoding circuit 112. In the figure, "0" in an entry field indicates that the direction of the corresponding edge is the same as its initial direction, while "1" in an entry field indicates that the direction of the corresponding edge is opposite to its initial direction. The LRU decoding circuit 112 checks LRU information entered according to the logic shown in a decoding table 301, and determines the least recently accessed way.

For example, way 0 is a least recently accessed way when all the arrows NEWERs (0), (3), and (4) connected to the way 0 start from the way 0. That is, each of the arrows NEWERs (0), (3), and (4) has the same direction as its initial direction, as expressed as (0,3,4)=(0,0,0). Similarly, the way 1 is a replacement target way, when the NEWER (0) arrow has a direction different from its initial direction and the other arrows NEWERs (1) and (5) have the same direction as their initial directions, as expressed as NEWER (0,1,5)= (1,0,0).

With execution of an ordinary load instruction, LRU information is updated when a cache hit occurs, or data fetched from the main memory is written into a cache in the case of a cache miss. The LRU information is updated so that in the former case, a way storing data to be referenced by the load instruction is set as the latest way (most recently referenced), while in the latter case, a way in which data is to be newly written is set as the latest way.

As described above, the select way control circuit 113 selects the hit way signal 119 output from the hit/miss determination circuit 122 in the case of a cache hit, or selects the LRU way signal 151 output from the LRU decoding circuit 112 in the case of a cache miss, and outputs it as the select way signal 117. The select way signal 117 is fed to the LRU encoding circuit 110 through a selector 109. The LRU encoding circuit 110 encodes a way number indicated by the input select way signal 117 to produce a "NEWER (0–5)" to be registered with the LRU array. LRU information set in the LRU array 111 is updated based on information "NEWER (0–5)" encoded by the LRU encoding circuit 110.

FIG. 6 is an encoding table used to change the LRU function so as to indicate that a way indicated by an input select signal is the most recently accessed way in the LRU encoding circuit 110. In the figure, a "0" set in an entry field indicates that the direction of the corresponding edge is the same as its initial direction shown in FIG. 4, while "1" indicates that the direction of the corresponding edge is opposite to its initial direction. The LRU encoding circuit 110 generates information used for updating LRU information so that a way indicated by a select way signal entered according to the logic shown in the decoding table 301 is set as the latest way.

For example, when the LRU encoding circuit 110 receives an input indicating the way 0, the circuit changes LRU information bits corresponding to NEWERs (0), (3), and (4) to "1" according to an encoding table 302. This means that all the arrows connected to the way 0 are directed toward the way 0 in FIG. 4. Similarly, when the LRU encoding circuit 110 receives an input indicating the way 1, the circuit sets "0" to an LRU information bit corresponding to NEWER (0) and "1" to LRU information bits corresponding to NEWERs (1) and (5).

Next, the operation of the cache memory system 100 according to execution of a prefetch instruction is described. When a cache miss occurs with an ordinary load instruction, a least recently accessed way is selected from among all ways in the target set, as a replacement target. With a prefetch instruction, a least recently accessed way is selected from among the ways allowed to be used by prefetch instructions in the target set, as a replacement target. In this embodiment, the number of ways which can be used by prefetch instructions is limited to two: way 0 and way 1 from a total of 4 ways. It should be noted, however, that the scope of the present invention is not limited to this specific embodiment. The number of ways which can be prefetched can be changed using a similar method without departing from the scope of the present invention.

When a prefetch instruction is executed by the CPU, the cache memory system 100. accesses its memory unit 101 according to the set address portion of an address referenced by the instruction, as is the case with an ordinary load instruction, and reads data, tags, and LRU information in the set. In the case of a cache hit, the execution process of the prefetch instruction ends after the data is read, as described above with the load instruction. At that time, LRU information is changed so as to indicate that a way storing hit data is the most recently referenced way, as is the case with an ordinary load instruction.

When a cache miss occurs with a prefetch instruction, a way number indicating a replacement target way is output as the select way signal 117 as in the case of an ordinary load instruction. A data block fetched from the main memory is stored in this replacement target way. A replacement target way is determined as follows. When a cache miss occurs, an LRU signal 131, which is LRU information on the target set, is output from the LRU array 111. The LRU signal 131 is input to the prefetch way limitation circuit 130. The prefetch way limitation circuit 130 outputs an LRU signal 132 obtained by limiting ways usable by prefetch instructions. The LRU signal 132 is fed to the LRU decoding circuit 112 which determines a replacement target way as described above with an ordinary load instruction.

Figures 7, 8:
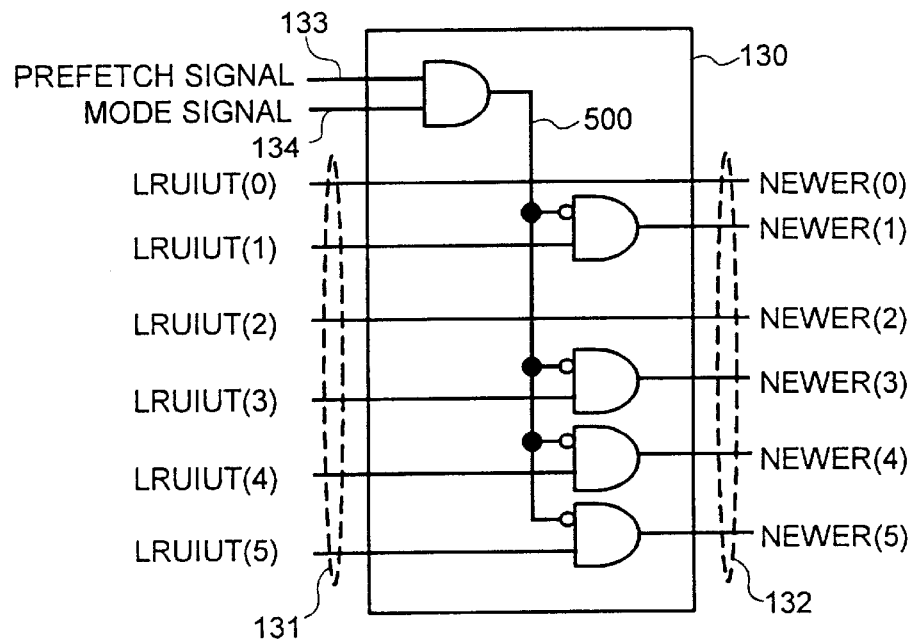
FIG. 7 is a block diagram of the logic structure of a prefetch way limitation circuit 130.
FIG. 8 is a diagram of a logical table of control logic for determining a replacement target way while considering the number of on-the-fly prefetch instructions to a same set.

FIG. 7 is a block diagram of the logic structure of the prefetch way limitation circuit 130. The LRU signal 131 output from the LRU array 111 includes the following 6 bits: LRUOUTs (0) through (5). A prefetch signal 133 indicates that an instruction currently accessing a cache is a prefetch instruction. A mode signal 134 indicates a mode in which prefetch ways are limited. When the mode signal 134 is "1", ways to be used by prefetch instructions are limited. When the mode signal 134 is "0", on the other hand, use of ways is not limited even with a prefetch instruction, and all ways are used as is the case with an ordinary load instruction.

A specific bit of an SPR in the register file 16 is used as the mode limitation signal 134. To set the mode limitation signal 134 to "1", for example, a value for setting "1" to the bit of the SPR corresponding to the mode limitation signal 134 is set in a general purpose register in the register file 16, and the value of this register is copied to the SPR. When "1" is set to the specific bit of the SPR corresponding to the mode signal using the above process, a "1" is output as the mode limitation signal 134 and fed to the cache memory system 100. To reset the mode limitation, "0" is set to the specific bit of the SPR using a process similar to the above process.

A way limitation signal 500 is set to "1" when the instruction currently accessing the cache memory system 100 is a prefetch instruction and the prefetch way limitation mode is the current mode. When the way limitation signal 500 is "1", of the outputs NEWERs (1) through (5) of this circuit, the outputs NEWERs (1), (3), (4), and (5) are set to "0". This means that in FIG. 4, the directions of the arrows corresponding to NEWERs (1), (3), (4), and (5) are fixed so that they start from the way 0 or 1 toward the way 2 or 3. That is, by setting "0" to NEWERs (1), (3), (4), and (5), and fixing them, the LRU decoding circuit 112 regards the ways 0 and 1 as being accessed less recently than the ways 2 and 3, making it possible to limit replacement target ways to the ways 0 and 1 when a prefetch instruction is executed. Incidentally, by setting "0" to NEWERs (0), (3), and (4) and fixing them, it is possible to limit replacement target ways to only the way 0, while it is possible to limit replacement target ways to three ways: the ways 0, 1, and 2, by setting "0" to NEWERs (1), (2), and (5) and fixing them.

The LRU decoding circuit 112 determines a replacement target way number based on the LRU signal 132 output from the prefetch way limitation circuit 130. The LRU decoding circuit 112 converts LRU information into a way number based on the decoding logic shown in the decoding table 301. When an instruction other than a prefetch instruction is issued by the CPU, the LRU decoding circuit 112 outputs a way number obtained as a result of this conversion indicating that the way specified by this way number is a replacement target. In the case of a prefetch instruction, on the other hand, a replacement target way is determined further considering the number of on-the-fly prefetch instructions.

FIG. 8 illustrates a table of control logic for determining a replacement target way considering the number of on-the-fly prefetch instructions to the same set. When replace ways are limited as a result of using a prefetch instruction, a replacement target way number to be output is determined according to a logical table 303 using the relationship between a way number obtained from the decoding table 301 and the number of on-the-fly prefetch instructions to the same set.

According to the logical table 303, when the number of on-the-fly prefetch instructions to the same set is zero, a replacement target way number determined according to the logic shown in the decoding table 301 is output as is. When the number of on-the-fly prefetch instructions is 1, because the replacement target way output from the decoding table 301 is being used by a prefetch instruction already in execution, the way 1 also allowed to be used by prefetch instructions is set as a replacement target. Since in this embodiment, the number of ways usable by prefetch instructions is limited to two, if the number of on-the-fly prefetch instructions is none or one for the same set, a replacement target way can be determined using one of the usable ways.

When two or more on-the-fly prefetch instructions are issued to the same set, the LRU decoding circuit 112 removes a limit on ways usable by prefetch instructions, and controls the operation so that all ways in the same set can be used by a prefetch instruction. This removal of the limitation is performed to suppress an increase in cache misses in the following conditions:

A prefetch instruction is executed with two on-the-fly prefetch instructions already issued to the same set.

In this state, the two ways usable by prefetch instructions are determined to be used by the previously issued on-the-fly prefetch instructions.

If one of the two ways usable by prefetch instructions (ways in which on-the-fly prefetch instructions are allowed to write data) is set as a replacement target way, a block may be replaced from a cache before reading of its data has been completed, increasing cache misses.

According to the logical table 303, when a prefetch instruction is executed with two on-the-fly prefetch instructions already issued to the same set, since the ways 0 and 1 are already reserved, the way 2 is output as a replacement target if a way obtained as a result of a conversion using the decoding table 301 is the way 0. If a way obtained as a result of the conversion is the way 1, on the other hand, the way 3 is output as a replacement target. Similarly, when a prefetch instruction is executed with three on-the-fly prefetch instructions already issued to the same set, the way 3 or the way 2 is output as a replacement target.

In this embodiment, when a prefetch instruction is executed with two or three on-the-fly prefetch instructions already issued to the same set, the way 2 or 3 is fixedly selected as a replacement target according to a result derived from the decoding table 301. However, a replacement target way may be determined based on which of the way 2 or 3 is less recently accessed.

Figure 9:
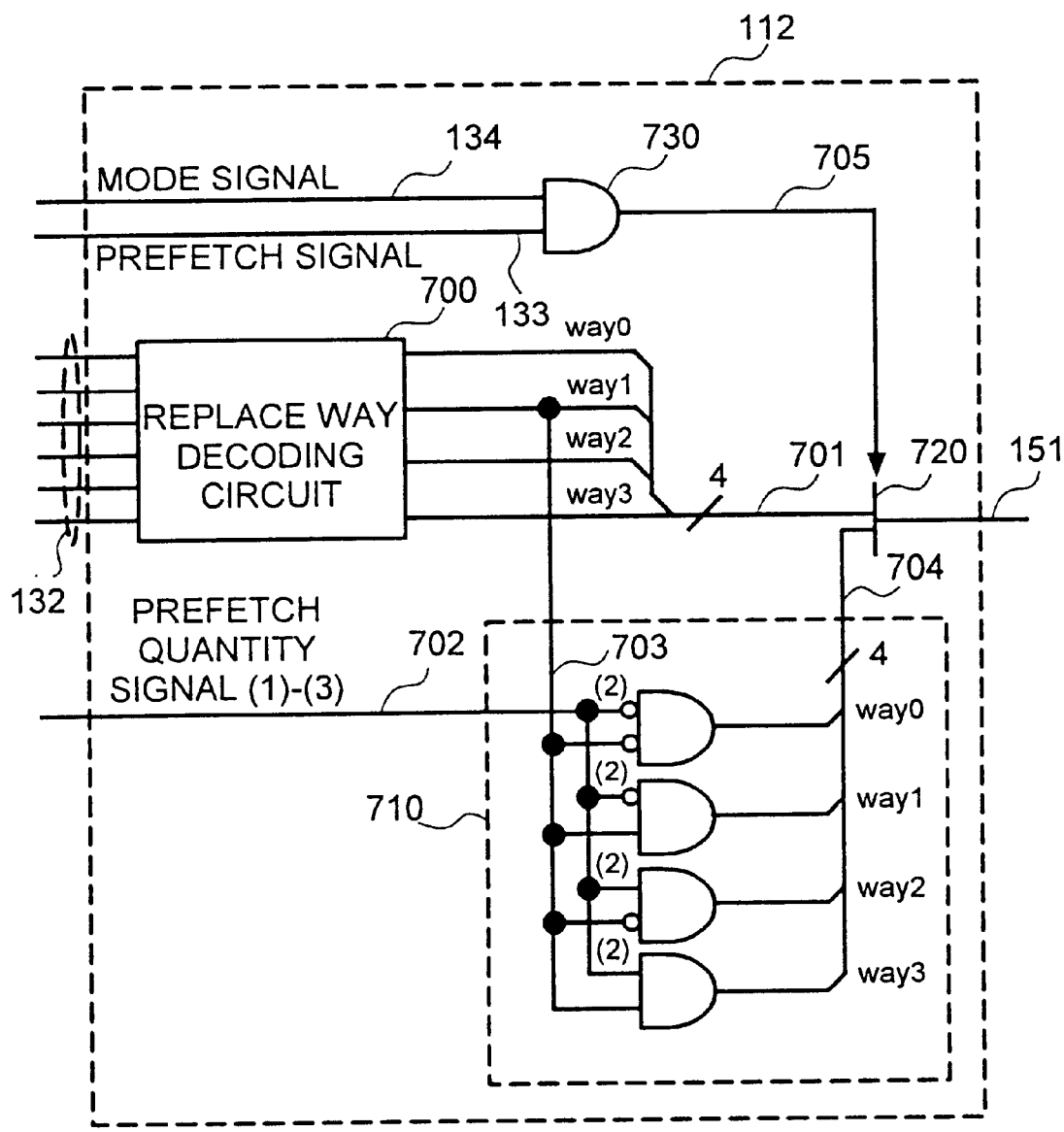
FIG. 9 is a block diagram of an LRU decoding circuit 112.

FIG. 9 is a block diagram of a configuration of the LRU decoding circuit 112. As its inputs, the LRU decoding circuit 112 receives the LRU signal 132 output from the prefetch way limitation circuit, the mode signal 134 for indicating that the current mode is the prefetch way limitation mode, and the prefetch signal 133 for indicating that the instruction currently in execution is a prefetch instruction. The LRU decoding circuit 112 outputs the LRU way signal 151 indicating a selected way number.

The input LRU signal 132 is converted into a way number by a replace way decoding circuit 700. The replace way decoding circuit 700 converts the input LRU signal 132 according to the logic shown in the decoding table 301, and outputs a 4-bit primary LRU way signal 701 indicating one of the ways 0 through 3. A value "1" is set to the bit of the primary LRU way signal 701 corresponding to a way selected according to the logic shown in the decoding table 301.

A select way determination circuit 710 determines a select way based on the number of on-the-fly prefetch instructions to the same set when ways from which to select a replace way are limited. As its inputs, the select way determination circuit 710 receives a prefetch quantity signal (0 to 3) 702 indicating the number of prefetch instructions to the same set, and a prefetch way 0 signal 703 which is set to "1" when the replace way decoding circuit 700 selects the way 0. Based on these input signals, the select way determination circuit 710 outputs a secondary LRU way signal 704 specifying a way to be selected according to the logic shown in the logical table 303.

The primary LRU way signal 701 and the secondary LRU way signal 704 are fed to a selector 720. The selector 720 selectively outputs the primary LRU way signal 701 or the secondary LRU way signal 704 based on a switching signal 705 obtained as an output from an AND gate 730 to which the mode signal 134 and the prefetch signal 133 are input. Specifically, when both the mode signal 134 and the prefetch signal 133 are "1", and the current mode limits ways usable by prefetch instructions, the selector 720 outputs the secondary LRU way signal 704 as the LRU way signal 151. Otherwise, the selector 720 outputs the primary LRU way signal 701 as the LRU way signal 151.

FIG. 10 shows a program in which a large array having spatial locality but not temporal locality is accessed. The program shown in FIG. 10 copies an array S of 100☐16000 elements each having 8 bytes, to an array T of 100☐16000 elements. In an inner loop 801, 16000 elements are copied, and this process is iterated 100 times in an outer loop 802 to make a copy of all elements. It is assumed that in the outer loop 802, a local variable in a stack is accessed each iteration before the inner loop 801 is started, as indicated by a line 803 in the program. Furthermore, it is assumed that the first element of each of the arrays S and T is aligned to a 128-byte boundary.

In this program, memory references for the arrays S and T are made to addresses relatively close to one another during a certain period of time, but a reference to the same address occurs only once. Accordingly, the memory access pattern of the arrays S and T has spatial locality but not temporal locality. Data in the stack referenced by the line 803, on the other hand, has temporal locality since the same address is referenced each iteration of the outer loop 802.

FIG. 11 shows a program in which the inner loop 801 of the program shown in FIG. 10 is replaced with pseudo-instructions. The inner loop 901 of the program in FIG. 11 is written using pseudo-instructions and loads each element of the array S and stores it in each element of the array T. The inner loop 901 is iterated 16000 times. Since each element of the array S has 8 bytes, a memory area of 128K bytes, which is the same as the cache size, is sequentially accessed for each iteration of the outer loop 802.

FIG. 12 shows a program obtained by applying prefetch instructions to the above program. In this program, an inner loop 1001 is divided by each way to be accessed, for easy understanding. The following illustrates what happens when this program is executed without limiting ways usable by prefetch instructions. In the first iteration of an outer loop 1000, a block storing stack data is copied to a cache, as indicated by a line 1010 "use of a local variable". Inner loops 1002 through 1005 each uses 128 bytes for each iteration. That is, The inner loops 1002 through 1005 use 128K bytes during all iterations. Since the array S sequentially accesses data, the way 0 is used for the first 32K bytes, the way 1 for the next 32K bytes, the way 2 for the following 32K bytes, and the way 3 for the last 32K bytes. This means that execution of the inner loop 1001 overwrites the entire cache with the array S.

Because of this, when the stack is referenced again afterward as indicated by the line 1010 "use of a local variable" in the next iteration of the outer loop 1000, a cache miss occurs. In this program, a cache miss occurs with the line 1010 "use of a local variable" each iteration of the outer loop 1000. On the other hand, when ways to be used by prefetch instructions are limited by setting "1" to the mode signal 134, the following occurs. Data to be used in the loop 1002 is prefetched in the way 0, while data to be used in the loop 1003 is prefetched in the way 1. Then, when data to be used in the loop 1004 is prefetched, the data is fetched in the way 0 again since usable ways are limited. Similarly, data to be used in the loop 1005 is fetched in the way 1.

As illustrated above, limiting ways usable by prefetch instructions increases the possibility that a local variable referenced by the line 1010 "use of a local variable" remains in the cache even after the entire inner loop 1001 has been executed. In this embodiment, by limiting ways to be replaced from a cache memory system when a cache miss occurs with a prefetch instruction, it is possible to reduce occurrence of data with temporal locality being replaced from the cache by reference of data having spatial locality but not temporal locality. Furthermore, this embodiment can properly perform the LRU function in the multiprocess environment without employing a special process.

It should be noted that the present invention is not limited to the above embodiments as various modifications and changes can be made within the scope of the appended claims. For example, the present invention can be applied to a cache memory system having a different cache size, a different block size, or a different number of ways. Furthermore, the present invention can be applied to not only a store-through cache memory system but also a store-in cache memory system.

The preceding has been a description of the preferred embodiment of the invention. It will be appreciated that deviations and modifications can be made without departing from the scope of the invention, which is defined by the appended claims.

What is claimed is:

1. A cache memory system employing a set associative system with a plurality of ways which can store data having a same set address, the cache memory system comprising:
   a mode signal generating circuit for inputting a mode signal which indicates whether replace ways used for storing a block containing data to be accessed when a cache miss occurs, are used as a limiting mode for limiting use of the replace way or as a nonlimiting mode for not limiting use of the replace way; and
   a replace way determining circuit which in response to the mode signal, selects a replace way from among the plurality of ways.

2. The cache memory system as claimed in claim 1 wherein the mode signal is enabled when an instruction to be executed is a prefetch instruction.

3. The cache memory system as claimed in claim 2 wherein the replace way determining circuit determines the replace way based on the number of prefetch instructions in execution.

4. The cache memory system as claimed in claim 1, wherein the replace way determining circuit comprises:
   a storage for holding information to specify a way which stores least recently accessed data, from the plurality of ways;
   a limiting circuit for, when replace ways are limited by use of the mode signal, receiving, as its input, the information output from the holding means, and limiting the input information to information indicating that one of the part of ways stores least recently accessed data; and
   a decoding circuit for receiving, as its input, the information output from the limiting circuit, determining a replace way based on a predetermined logic, and outputting replace way information specifying the replace way.

5. The cache memory system as claimed in claim 4 wherein the limiting circuit receives, as its input, a prefetch signal for indicating whether an instruction to be executed is a prefetch instruction, and performing the limitation when the prefetch signal indicates that an instruction to be executed is a prefetch instruction.

6. The cache memory system as claimed in claim 5 wherein the decoding circuit comprises:
   a first converting circuit for converting information output from the limiting circuit based on the predetermined logic, and outputting first replace way specification information specifying a replace way;
   a second converting circuit for outputting second replace way specification information specifying a replace way based on at least part of the first replace way specification information and information indicating the number of prefetch instructions in execution which access a same set; and
   a selector for outputting either the first replace way specification information or the second replace way specification information as the replace way information based on the mode signal and the prefetch signal.

7. A processor comprising:
   an operation circuit for performing an operation according to an instruction;
   a cache memory employing a set associative system with a plurality of ways each composed of a plurality of blocks which each stores data to be used by the operation circuit; a mode signal generating circuit for, providing a mode signal which indicates whether replace ways used for storing a block containing data to be accessed when a cache miss occurs, are used as a limiting mode for limiting use of the replace way or as a non-limiting mode for not limiting use of the replace way;
   a replace circuit for controlling replacement of data stored in the cache memory according to a predetermined replace algorithm; and a limiting circuit for limiting ways to which blocks to be replaced by the replace circuit belong.

8. The processor claimed in claim 7 further comprising a mode signal generating circuit for generating a mode signal specifying whether the limiting circuit should perform the limitation, and supplying the mode signal to the limiting circuit.

9. The processor claimed in claim 8 wherein the mode signal generating circuit includes a register, and outputs the mode signal based on a state of a predetermined bit in the register.

10. The processor claimed in claim 8 wherein the limiting circuit performs limitation according to the mode signal when data is transferred to the cache memory by execution of a prefetch instruction.

11. The processor claimed in claim 10 further comprising a circuit for changing a method for determining a replace way based on the number of prefetch instructions in execution which access a same set.

12. The processor claimed in claim 11 wherein when the number of prefetch instructions in execution which access a same set is smaller than the number of ways usable by prefetch instructions, the circuit for changing a method for determining a replace way determines a replace way by shifting a way determined according to a predetermined algorithm by a number of ways equal to the number of prefetch instructions within the ways usable by prefetch instructions.

13. The processor claimed in claim 12 wherein when the number of prefetch instructions in execution which access a same set exceeds or equals the number of ways usable by prefetch instructions, the circuit for changing a method for determining a replace way determines a replace way by shifting a way determined according to the predetermined algorithm by a number of ways equal to the number of prefetch instructions within all ways in the respective set without limiting to the ways usable by prefetch instructions.

14. The processor claimed in claim 7 wherein the predetermined algorithm is an LRU algorithm.

* * * * *